UNITED STATES PATENT OFFICE.

KARL BARRÉ LAMB, OF NEW YORK, N. Y., ASSIGNOR TO THE AMERICAN COTTON OIL COMPANY, A CORPORATION OF NEW JERSEY.

PAINT COMPOSITION.

1,424,414.    Specification of Letters Patent.    Patented Aug. 1, 1922.

No Drawing.    Application filed February 2, 1922. Serial No. 533,554.

*To all whom it may concern:*

Be it known that I, KARL B. LAMB, a citizen of the United States, residing at New York city, in the county of New York, State of New York, have invented certain new and useful Improvements in Paint Composition; and I do hereby declare the following to be a full, clear, and exact description of the invention, such as will enable others skilled in the art to which it appertains, to make and use the same.

This invention relates to an improved paint composition adapted for use in place of paint compositions containing lamp black or similar carbon blacks.

In the manufacture of black paint compositions it is common to add lamp black and similar carbon blacks as black pigments. These pigments, however, are lacking in body, and, when used as paint pigments, they are usually used in conjunction with other pigments or fillers which serve to give body to the paint. When lamp black is used with white lead, a considerable amount of white lead can be used without destroying the essentially black color of the paint, although, if the amount of lead is too great, the paint will become grayish in color instead of black. With other white materials such as are used as fillers in making paint, the amount which can be used without destroying the black color of the pigment is limited and if a larger amount of the filler is used the paint loses its black color and becomes grayish.

The new paint compositions of the present invention contain black pigments of a composite character which include, in a single composite material, both a filler or body-giving material and a black pigment, so intimately associated with each other that the desired black color of the paint is preserved even with a relatively large amount of the filler or body-giving material.

The new paint compositions are made with a composite pigment which can itself be produced from a by-product of little if any value and which is frequently thrown away as worthless, namely, spent fuller's earth. The spent fuller's earth is that which results from the refining and decolorizing of oils and fats (for example, vegetable oils and fats such as cottonseed oil) with fuller's earth, which loses its effectiveness after a certain period of use and becomes what is commonly known as "spent." After the removing of as much as possible of the oil therefrom, the spent fuller's earth still contains a considerable amount of oil admixed therewith. By subjecting the spent fuller's earth to a regulated carbonizing operation, the oil in the spent earth is carbonized and converted into a black pigment in most intimate distribution with respect to the fuller's earth base so that the product of the regulated carbonizing operation is a composite product with the carbon from the oil combined in an integral or intimate manner with the fuller's earth base.

The carbonization may be conducted to produce the new composite pigment which may be carried out in various ways of which the following are specific examples.

The spent fuller's earth, having the oil intimately distributed throughout its mass, may be placed in an open pan and heated by direct flame until the gases resulting from the decomposition of the oil are ignited. The heating of the earth then should be discontinued or so regulated that the mass of earth and oil burns quietly. The burning should be carried out at as low a temperature as possible, and the mass should be stirred continually or from time to time throughout the operation. As the carbonization progresses, the earth becomes black in color until the product as a whole is an intense black, when heating should be discontinued so that the product may cool.

While carbonization may be satisfactorily accomplished in the manner described, a preferred method for the commercial production of the pigment is to carbonize it in a closed retort or rotary furnace, preventing oxidation as much as possible by the proper control of the air in the retort or furnace. The heating should be regulated so that the mass of earth and oil burns quietly. A rotary furnace provides an automatic stirring of the material and also allows a better recovery in the furnace itself, of lamp black formed from the burning of the oil. After the carbonization has progressed to such a point that all the oil has been carbonized, heating should be stopped in order to prevent oxidation, and the resulting product allowed to cool. When the carbonized material prepared in either of the ways described is cool, it can be discharged and then ground in a ball mill until a sufficient degree of fineness for pigment purposes is obtained.

During the carbonizing operation a considerable amount of "smoke" is formed from the decomposition of the oil content of the spent fuller's earth, particularly if the burning, carbonizing, and stirring operations are carried on at a low temperature, and with limited access of air. The finely divided carbon of this smoke appears to be precipitated in part throughout the fuller's earth, although a considerable amount of it escapes as smoke with the gaseous products of the carbonizing operation. This smoke can be treated for the precipitation and recovery of the carbon or lamp black therefrom, in much the same way that lamp black is recovered when made from oil. The lamp black thus separately recovered is itself a valuable product and can be separately used in place of lamp black made from other sources. It can also be advantageously combined with the composite black pigment formed by carbonizing the spent fuller's earth itself, thereby increasing the intensity of the black color of the composite pigment by adding a certain percentage of the separately collected lamp black thereto.

The decomposition and carbonization of the oil throughout the mass of the fuller's earth results in a most intimate production and deposition of the carbon black in and upon the particles of the earth, so that the product has an intense black color. The black color thus imparted to the earth may be considered to be due to three causes, namely (1) to the actual formation of finely divided carbon from the oil within the body of the fuller's earth; (2) the precipitation of the oil smoke in a finely divided state within the mass of the fuller's earth; and (3) the incorporation of the lamp black separately precipitated from the smoke, when this separately produced lamp black is admixed with the original composite pigment. As a result of this intimate production and deposition of the carbon black in and upon the particles of the earth, even though but a small percentage of the total weight of the composite pigment is made of the carbon black, the whole product is nevertheless of an intense black color. The fuller's earth, which is itself of a porous structure, appears to be intimately coated or plated with the deposited black. As a result, the composite product, although of an intense black color, nevertheless has a relatively large amount of fuller's earth intimately combined therewith, so that the composite pigment can be used to particular advantage for purposes where a pigment having considerable body, as well as an intense black color, is desired.

In making the new paint compositions, the composite pigment can be ground in oil or incorporated with the paint vehicle in any suitable way. In color, the composite pigment resembles lamp black, although it possesses sufficient body so that the addition of body-giving pigments or materials is not necessary, although such added pigments may be used where desired. Even without any additional admixed pigments, the resulting paints have good covering properties and a desirable body in addition to an intense black color, and they are therefore distinguished from paints containing ordinary lamp black or carbon black together with admixed (but not combined) pigments or fillers.

The new paint compositions may have other black pigments or white or colored pigments admixed therewith, for example, white pigments to give a paint of a gray color. That is, the paint compositions can be made with the composite black pigment and the paint vehicle, or with other pigments or with fillers, either in the production of jet black or gray paints. In general, the new paint compositions can be used in place of other black paints, where the characteristic properties of the paint adapt it for use.

The vehicle used in making the paint compositions can be varied. For many purposes linseed oil makes the best vehicle, although mixed vehicles, or vehicles with driers, etc., can be used. For example, a mixed paint can be made by compounding about 50 parts of composite pigment with about 50 parts of raw linseed oil containing a suitable amount of a drier incorporated therewith. The amount of the vehicle can of course be varied, as well as the nature of the vehicle, etc.

The composite black pigment itself is not claimed herein but is claimed in my prior application, Ser. No. 464,986, filed April 22, 1921, of which the present application is in part a continuation, the claims for the paint composition of the present invention having been cancelled from said application in compliance with the official requirement for division.

I claim:

1. A paint composition comprising a paint vehicle and a composite black pigment resulting from the carbonization of spent fuller's earth under conditions to develop an intense black color.

2. A paint composition comprising a paint vehicle, a composite black pigment resulting from the carbonization of spent fuller's earth under conditions to develop an intense black color, and other pigments.

3. A paint composition comprising a paint vehicle, a composite black pigment resulting from the carbonization of spent fuller's earth under conditions to develop an intense black color, and a drier.

4. A paint composition comprising a paint vehicle, a composite black pigment resulting from the carbonization of spent fuller's earth under conditions to develop an intense black color, other black pigments, and a drier.

5. A paint composition comprising a vehicle and a composite black pigment made from spent fuller's earth by a heating and carbonizing operation.

6. A paint composition comprising a paint vehicle and a composite black pigment, said pigment being made up of a body-giving pigment base and a carbon black pigment coating and integrally combined with the base.

In testimony whereof I affix my signature.

KARL BARRÉ LAMB.